United States Patent [19]

Kuriyama et al.

[11] Patent Number: 4,709,292

[45] Date of Patent: Nov. 24, 1987

[54] TROUBLE DETECTOR APPARATUS FOR AN AIR-CONDITIONER INCLUDING A COUNTER AND A TIMER

[75] Inventors: Keiichi Kuriyama, Kusatsu; Kenichiro Miura, Otsu; Takashi Deguchi, Kusatsu, all of Japan

[73] Assignee: Matsushita Electric Industrial Co., Ltd., Kadoma, Japan

[21] Appl. No.: 684,724

[22] Filed: Dec. 21, 1984

[30] Foreign Application Priority Data

Dec. 23, 1983 [JP] Japan ................................. 58-246097

[51] Int. Cl.$^4$ ............................................. H02H 7/08
[52] U.S. Cl. ........................................ 361/22; 361/72; 361/73
[58] Field of Search ............................. 361/22, 72, 73

[56] References Cited

U.S. PATENT DOCUMENTS

| | | | |
|---|---|---|---|
| 3,312,081 | 4/1967 | Berger et al. | 361/72 |
| 3,405,318 | 10/1968 | Gilker | 361/73 |
| 4,084,204 | 4/1978 | Jacobus, Jr. | 361/72 |
| 4,268,884 | 5/1981 | Ford, Jr. et al. | 361/22 |

Primary Examiner—A. D. Pellinen
Assistant Examiner—Jeffrey A. Gaffin
Attorney, Agent, or Firm—Cushman, Darby & Cushman

[57] ABSTRACT

A trouble detection apparatus for an air conditioner detects overcurrents occurring within a predetermined time period $t_2$ which is a shortest time period necessary for stabilization of the compressor operation. By counting a number of occurrences of the above-mentioned detections as criteria of actual trouble, the compressor is stopped when the number becomes two or more; thereby unnecessary interruption of operation of the air-conditioner due to electric noise or a simple overload is eliminated.

9 Claims, 6 Drawing Figures

TROUBLE DETECTOR APPARATUS FOR AN AIR-CONDITIONER INCLUDING A COUNTER AND A TIMER

BACKGROUND OF THE INVENTION

1. Field of the Invention

The present invention relates generally to a trouble detection apparatus for air-conditioner, and particularly concerns a trouble detection apparatus for air-conditioner comprising an overcurrent detection circuit.

2. Description of the Prior Art

In recent years, energy saving in an air-conditioner system has become desirable. Accordingly, a modern trend has included employing a variable speed compressor to be operated by a variable frequency inverter in the air-conditioner. One conventional air-conditioner comprising such variable speed compressor operated by the variable frequency inverter is elucidated with reference to FIG. 1 which is a circuit block diagram of the main part of the air-conditioner, and FIG. 2 which is a time chart for elucidating operation of the circuit of FIG. 1.

In the conventional air-conditioner apparatus of FIG. 1, an AC current is received, through a rush current prevention reactor L1, by a full wave rectifier circuit 12 consisting of four diodes D1, D2, D3 and D4, and capacitors C1 and C2 connected in series for double, or full wave, voltage rectifying and a smoothing capacitor C3. The full-wave voltage-rectified voltage across the capacitor C3 is coupled through a resistor R1 to an inverter 2 comprising six transistors Q1, Q2, Q3, Q4, Q5 and Q6 and diodes D5, D6, D7, D8, D9 and D10. The bases of the transistors Q1 through Q6 receive control signals from a switching control circuit 6 of a control part 30, to control ON and OFF states of the transistors Q1 through Q6, to thereby generate AC current of a necessary frequency. The output AC current of the inverter 2 is fed to a compressor 7. Accordingly, the compressor 7 is driven at a rotation speed defined by the control signals from the switching control circuit 6.

Operation of the above-mentioned conventional air-compressor is as follows. When the compressor 7 or any of the transistors Q1 through Q6 of the inverter 2 becomes faulted, the current flowing through the resistor R1 increases, thereby increasing voltage thereacross. Then, the increase of the voltage causes the comparator 3 to issue an output signal to the logic circuit 4, and the logic circuit 4 issues a signal to the switching control circuit 6, thereby to stop generation of the AC current by the inverter and to stop the compressor 7.

In the waveform (A) of FIG. 2 showing inverter current, a peak 21 indicates a time of detection of inverter current exceeding a predetermined value (e.g., 28 A), at which the compressor 7 is stopped. Then a pause timer 5 of the control part 30 induces the switching control circuit 6 to make the compressor motor 7 stop for a predetermined time T (for instance, about 3 minutes) which is necessary for stabilization of refrigerant circuit for next starting. That is, when the DC current flowing into the inverter 2 increases as a result of overcurrent of the compressor 7, the overcurrent is detected by the control part 30, and stops the compressor 7 for the predetermined pause time period T. After a lapse of the pause time of T, the compressor is re-started with a stabilized state of the refrigerant circuit, and operates.

However, in case of a trouble of the compressor 7 or trouble of any of the transistors Q1 through Q6, the overcurrent above the predetermined value is again detected at the current value 22 of the waveform (A) of FIG. 2 within a predetermined longer time $t_1$. Then the logic circuit determines that it is more than a spurious problem in the compressor 7, and the compressor is permanently stopped. Thereafter, until a manual operation is initiated to make the circuit re-start the compressor, the compressor is retained in stopped mode, pending a thorough checking of the system. The above-mentioned longer time period $t_1$ is also defined by the timer 5. In the above-mentioned conventional circuit of FIG. 1, since the predetermined longer time $t_1$ is defined very long, such as 30 minutes, there is a liability that receiving of noises by the logic circuit 4 thereby making the switching control circuit 6 stop the compressor 7 irreversibly, even though there is no real trouble in the compressor 7 or any of the transistors Q1–Q6. Accordingly, the conventional air-conditioner has had a shortcoming that the air compressor is likely to be irreversibly stopped without actual necessity, thereby making the user uncomfortable.

SUMMARY OF THE INVENTION

The purpose of the present invention is to provide a trouble detection apparatus for air-conditioner capable of more reliable trouble detection and enabling reliable operation.

A trouble detection apparatus in accordance with the present invention comprises:
  a control part for detecting an overcurrent above a predetermined value of current in a circuit for driving the air conditioner, and for disabling the driving of the air-conditioner when not less than twice of the overcurrent is detected within a predetermined time.

Further object of the present invention is to improve the trouble detection apparatus for air-conditioner in a manner that occurrence of overcurrent i.e. increase above a predetermined value of DC current in the inverter within a smallest time necessary for stabilization of the compressor from a starting of compressor operation is detected and the number of occurrence of the detection is counted, and only when two or more of the number of occurrence is counted the case is determined as an actual trouble of the system and makes the compressor stop, so that operation of the air-conditioner can be improved.

Furthermore, the apparatus in accordance with the present invention can indicate the result of the trouble detection to user by means of an indication means.

Still further, a trouble detection apparatus in accordance with the present invention can easily indicate the trouble by specifically indicating kind of trouble by processing information by using the time function of a micro computer and counter function of the same.

BRIEF DESCRIPTION OF THE DRAWINGS

These and other object and feature of this invention will be apparent upon consideration of the following detailed description taken together with the accompanying drawings, wherein.

DESCRIPTION OF THE PREFERRED EMBODIMENTS

Figure 1:
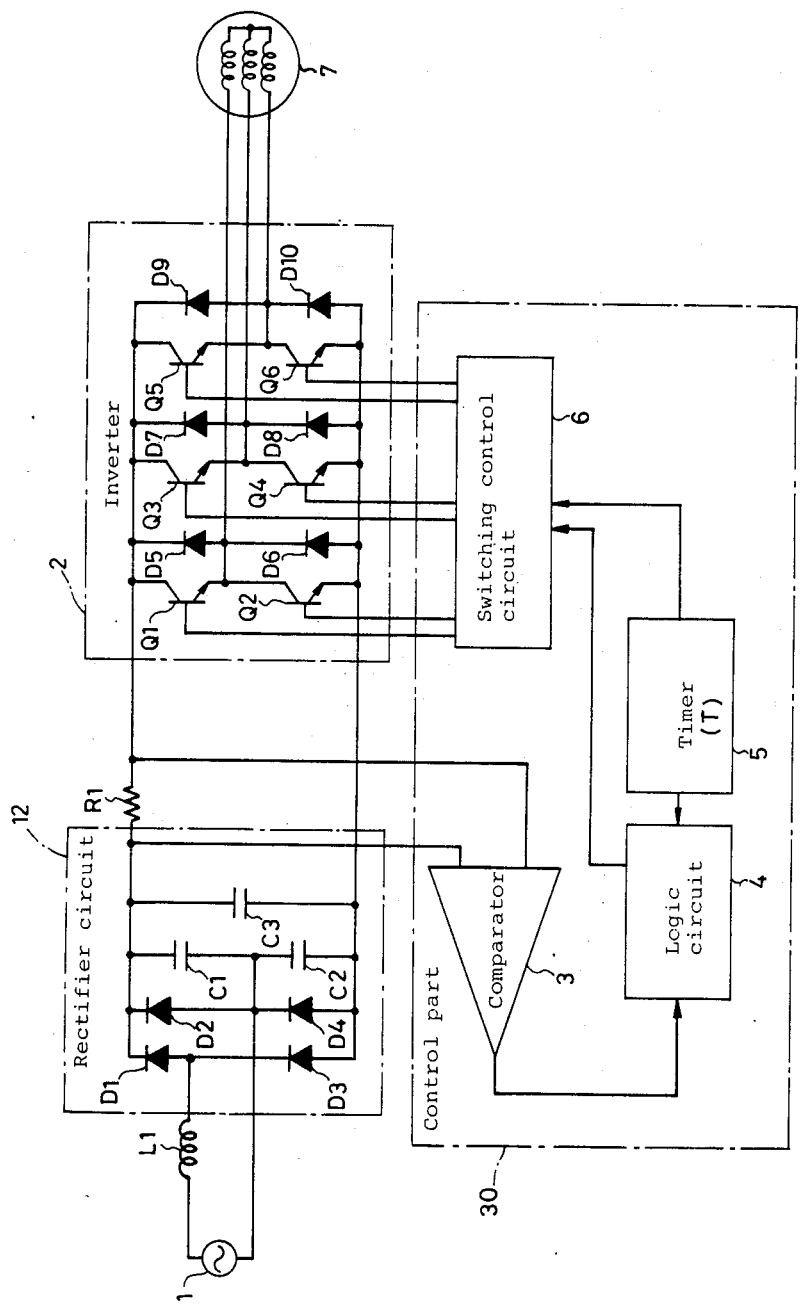
FIG. 1 is a circuit diagram of a conventional trouble detection apparatus for an air-conditioner.
Figure 2:
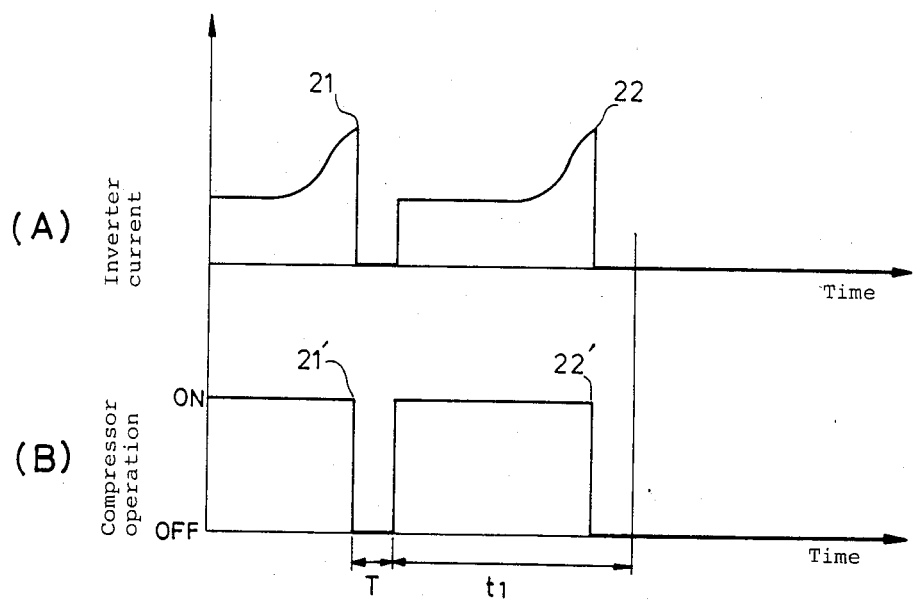
FIG. 2 is a time chart showing DC current of an inverter in waveform (A) and operation states of compressor in waveform (B).
Figure 3:
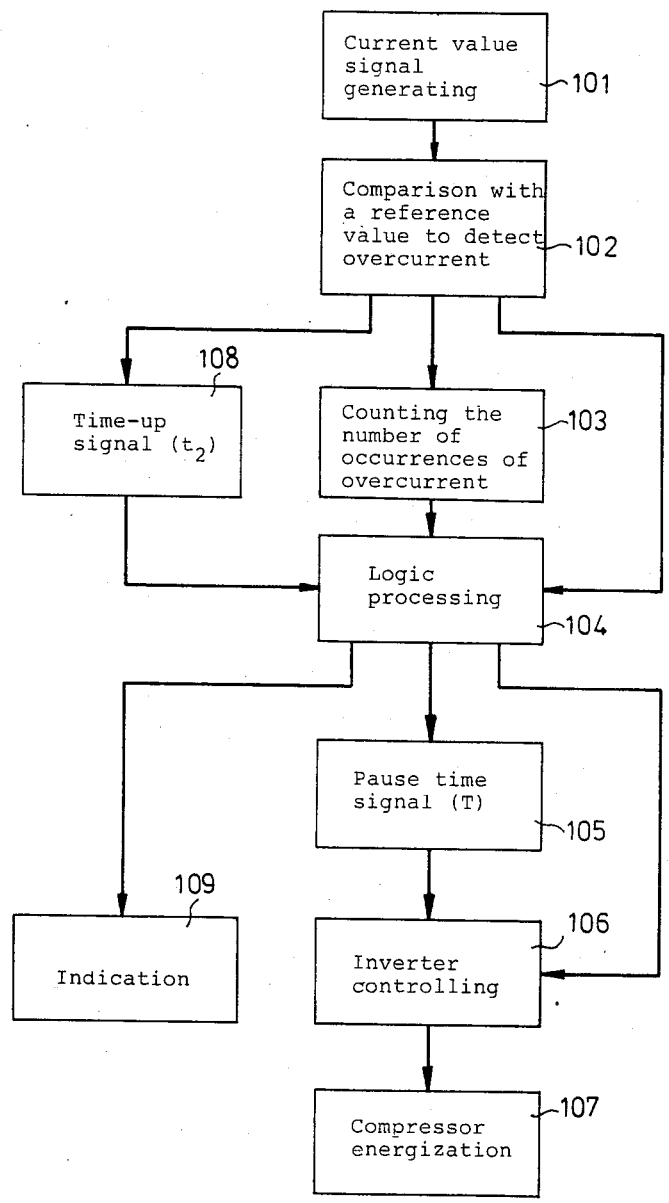
FIG. 3 is a block diagram showing substantial means of the trouble detection apparatus in accordance with the present invention.

FIG. 3 shows material means which constitute preferred embodiment of the present invention. As shown in FIG. 3, the air-conditioner comprises means of: current value signal generating 101, comparison of the current value signal with a predetermined reference value 102, measuring of a first time to issue a first time signal 108, counting the number of occurrences of overcurrent 103, logic processing 104 made by receiving the result of the first time signal means 108 and the counting of the number of occurrence of the overcurrent 103 to determine an occurrence of trouble, pause time generation 105 for defining a pause time which is necessary for a stable next re-starting of the compressor, inverter controlling 106 to make the inverter to drive the compressor or to stop the compressor for the pause time, compressor energization 107 made by receiving the signals as a result of the inverter controlling 106 thereby to drive or stop the compressor, and indication 109 for indicating occurrence of a trouble of the air-conditioner for the user. The means of logic processing 104 also has a known function which controls rotation speed of the compressor or frequency of the inverted AC output fed to the compressor from an inverter, responding to an amount of load of the air-conditioning, and means of inverter controlling 106 also makes a known function to drive the compressor at a desired rotation speed responding to the result of the logic processing 104.

Figure 4:
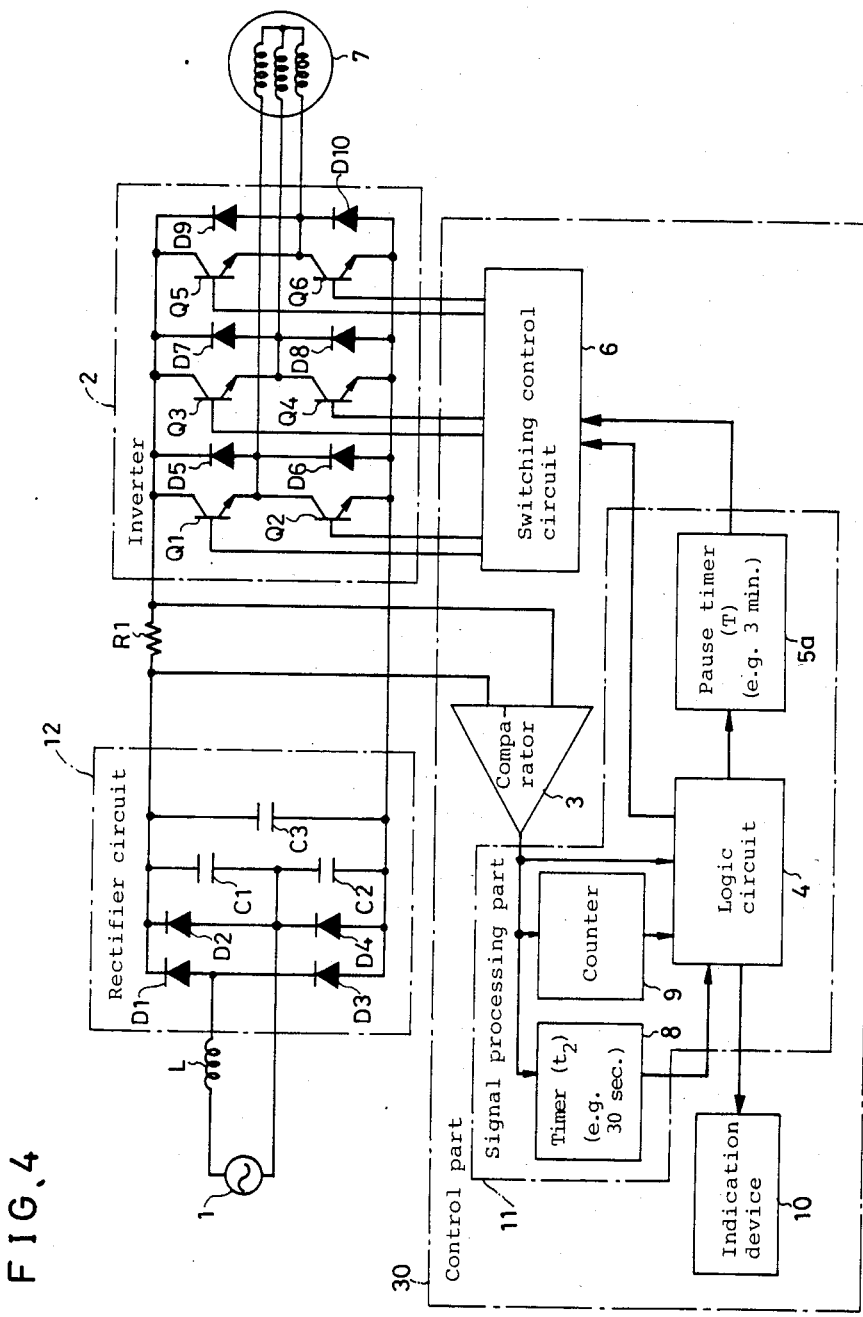
FIG. 4 is a circuit diagram of a preferred embodiment in accordance with the present invention of an air-conditioner comprising a trouble detection apparatus.

The above-mentioned combination can be realized into a concrete system as shown in FIG. 4. In the embodiment shown in FIG. 4, a rectifier circuit 12 of a known double voltage type comprising four diodes D1, D2, D3 and D4 and three capacitors C1, C2 and C3 are connected to an AC power source 1 through a rush current prevention inductor L. The rectified DC current from the rectifier circuit 12 is fed through a resistor R1 of a small resistance as current signal generating means to an inverter 2, which comprises six transistors Q1, Q2, Q3, Q4, Q5 and Q6 and six diodes D5, D6, D7, D8, D9 and D10 to constitute a known three phase inverter. Three output terminals of the inverter 2 are connected to the compressor 7 in a known way.

The embodiment system further comprises a control part 30 which comprises a comparator 3, a signal processing part 11, an indication device 10 and a switching control circuit 6. The comparator 3 compares 4 current value signal, which is a voltage across the resistor R1, with a predetermined reference value, and when the current value signal exceeds the reference value, issues an overcurrent signal. The signal processing part 11 comprises a first timer 8 which defines a shorter time, for instance, 30 seconds from an occurrence of the overcurrent signal from the comparator 3 and provide a time signal to a logic circuit 4. The signal processing part 11 also has a counter 9, which counts a number of occurrences of fall of the inverter current as the occurrence of the overcurrent within the above-mentioned shorter time (e.g. 30 sec), and when a predetermined number, e.g. two overcurrent signals, are received from the comparator 3 in sequence, issues an output signal to the logic circuit 4. The logic circuit 4 then issues an output signal to a pause timer 5a which defines a longer time, for instance, 3 minutes. The switching control circuit 6 receives the output signals from the logic circuit 4 and the pause timer 5a. The indication device 10 is for indicating a trouble when the logic circuit 4 recognizes an occurrence of the trouble.

The logic circuit 4 determines by receiving signals from the comparator 3, the timer 8 and the counter 9, whether to prohibit re-starting of the compressor 7 and whether an indication of trouble occurrence is to be made on the indication device 10. The switching control circuit 6 provides driving signals to the bases of the transistors Q1 through Q6 of the inverter 2 when a signal to drive the compressor 7 for normal operation is given thereto from the logic circuit 4, and de-energizes the compressor 7 when the pause timer 5a provide a pause signal thereto, after the logic circuit detects two successive occurrences of the overcurrent within the predetermined shorter time $t_2$ (e.g. 30 seconds) from a start of the compressor 7.

In the actual embodiment, the signal processing part 11 comprising the timer 8, counter 9, logic circuit 4 and the pause timer 5a is constituted by a known micro computer function.

Figure 5:
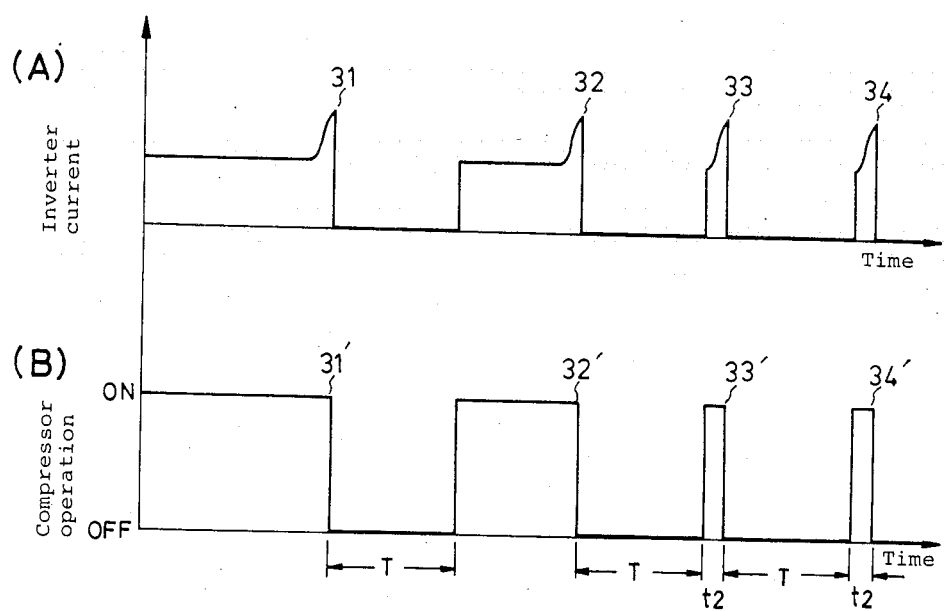
FIG. 5 is a time chart elucidating operation of the trouble detection apparatus of FIG. 4, wherein curve waveform (A) indicates inverter current and waveform (B) indicates compressor operation.
Figure 6:
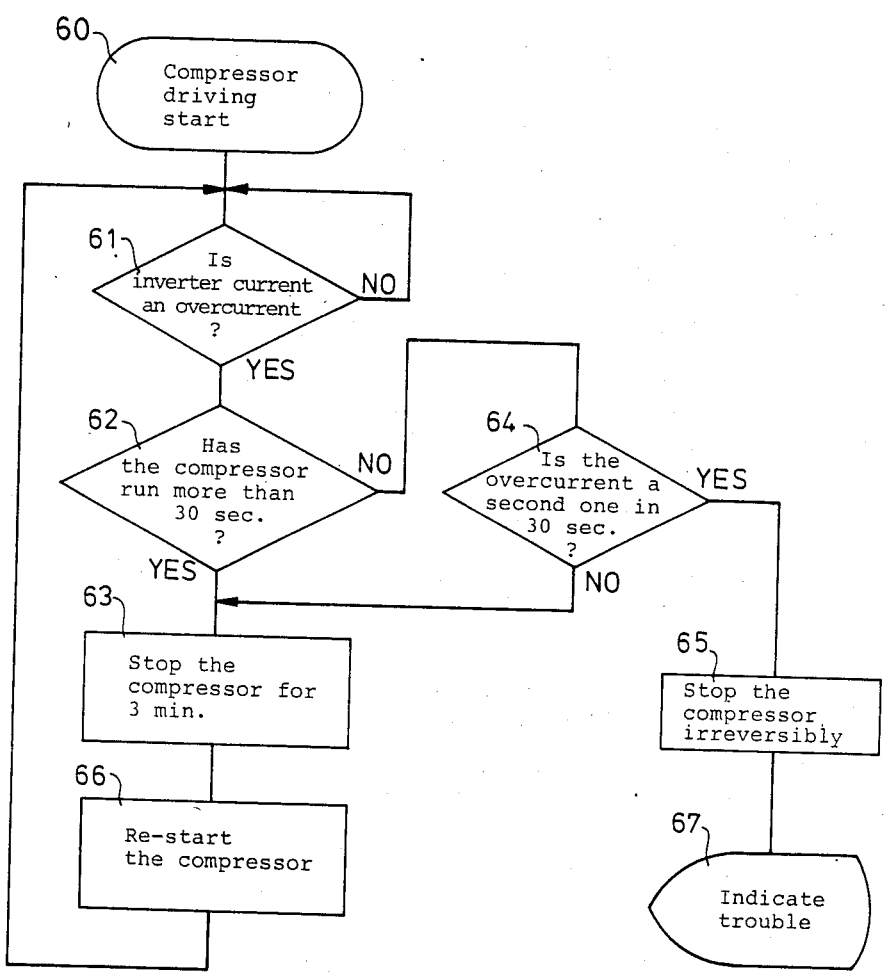
FIG. 6 is a flow chart showing operation of the trouble detection apparatus of FIG. 4.

The operation of the embodiment system shown in FIG. 3 and FIG. 4 is elucidated with reference to FIG. 5 which is a timing chart showing inverter current by waveform (A) and compressor operation in waveform (B). When an overcurrent occurs, the voltage across the resistor R1 exceeds the predetermined reference value and the comparator 3 issues an overcurrent signal to the logic circuit 4, the timer 8 and the counter 9. When the overcurrent takes place after lapsing of the shorter time $t_2$ (30 seconds) from the start of the compressor 7, the first detection signal of the overcurrent from the counter 9 induces nothing to the logic circuit 4. In such case, the logic circuit 4 induces the pause timer 5a to make the switching control circuit 6 stop the compressor 7 for the longer time T (e.g. 3 minutes) defined by the pause timer 5a. Therefore, the compressor 7 stops for the longer time T, and thereafter the compressor 7 re-start its rotation. The process is shown in the flow chart of FIG. 6 by the flow of steps 60-61-62-63-66 and again to 61 and repeating the same. Thereafter, when another overcurrent occurs as shown by the numerals 32 and 32' in the time chart of FIG. 5, the compressor 7 is stopped for the same short time period T in the same manner as the preceding case, and after lapsing of the short time T the compressor restores its operation. Upon re-starting of the compressor operation, the timer 8 starts counting of time for the shorter time $t_2$ (30 seconds) and outputs signals to the logic circuit 4 at the end of the shorter time $t_2$. Then, if, for example, due to a defect of one of the transistors Q1 through Q6, and a third overcurrent occurs as shown by a peak 33 in FIG. 5 within the time period of small $t_2$, the counter 9 records a first count as a noticeable overcurrent. This state corresponds to the returning flow from the step 66 to 61 of the flow chart of FIG. 6. Thereafter, the compressor 7 is stopped for the same longer time period T, and after lapse of the time period T the compressor 7 is re-started. If the system further has an overcurrent as shown by a peak 34 in FIG. 5 within the subsequent shorter time period $t_2$, the counter 9 makes a record in the second time as the noticeable overcurrent. At that time, by receiving two successive output signals of the noticeable overcurrent, the logic circuit 4 judges that the case is a trouble of the system, and issues a signal for an irreversible stop to the switching control circuit 6, to thereby irreversibly stop the compressor operation. This operation corresponds to the flow of the steps 61–62–64–65 and 67 of FIG. 6. The logic circuit 4 also makes the indication device 10 make an indication of the trouble of the system. The shorter time $t_2$ is selected to such a time period as the compressor reaches a stable state in normal operation after a re-starting. At the actual detection of trouble of the transistor or the inverter, the DC current to the inverter necessarily exceeds the predetermined reference value in this shorter time $t_2$.

As is elucidated with reference to the embodiment, the trouble detection apparatus in accordance with the present invention can detect an actual trouble in the compressor or transistor, in distinction from a simple overloading of the compressor, by detecting an overcurrent occurring within a predetermined time period $t_2$ which is the shortest time period necessary for stabilization of the compressor operation. By counting a number of occurrences of the above-mentioned detections as criteria of actual trouble, the compressor 7 is stopped when the number becomes two or more. Thus, reliability of trouble detection is improved, and unnecessary interruption of operation of the air-conditioner due to electric noise or due to a simple overload is remarkably eliminated.

What is claimed is:

1. A trouble detection apparatus for an air-conditioner system, comprising:
   a circuit for driving a compressor of an air conditioner;
   means for detecting overcurrent conditions in which current value above a predetermined value of current is flowing in said circuit for driving an air-conditioner;
   means for disabling said circuit for driving an air conditioner when at least two of said overcurrent conditions are detected within a predetermined time after turn-on of a compressor of an air-conditioning system; said circuit for driving a compresor of an air conditioner including inverter means for feeding variable frequency AC current to a compressor,
   and said detecting means comprises:
   current value signal generating means to produce a current value signal indicative of a current value in said inverter means;
   comparator means to generate an overcurrent detection signal by comparing a current value signal indicative of a current value in said inverter means with a predetermined reference value,
   and wherein said disabling means includes:
   (a) timer means to count a first predetermined time period, which is chosen so that at a termination of said first time period after an initial start of a compressor, the operation of a compressor has become substantially stable, and producing a time-up signal indicative of said termination of aid first time period,
   (b) means to count a number of overcurrent conditions which take place within said first predetermined time period from a starting of operation of a compressor,
   (c) logic means which issues a stopping signal which terminates the operation of a compressor when said counted number of overcurrent conditions exceeds a predetermined number, and
   (d) pause timer means to count a pause time from a stop of the operation of a compressor to allow a stabilizing of a compressor for stable re-starting of a compressor, and for generating a re-starting signal at the end of a predetermined pause time, and
   switching control means for operatively controlling said inverter means to generate a variable AC current to terminate and initiate operation of a compressor in response to said stopping signal from said logic means, and said re-starting signal from said pause timer means, respectively.

2. A trouble detection apparatus in accordance with claim 1, which further comprises:
   indication means, responsive to said stop signal, indicating trouble in a compressor.

3. A trouble detection apparatus for an air-conditioner comprising:
   a compressor;
   an inverter which feeds variable frequency AC current to said compressor,
   current value signal generating means which produces a current value signal, indicative of a current in said inverter;
   comparator means to generate overcurrent detection signals by comparing said current value signal with a predetermined reference value;
   a signal processing part comprising:
   (a) timer means which monitors an elapse of a predetermined time period during which the operation of said compressor becomes substantially stable after a start up, to issue a time-up signal indicative of said elapse,
   (b) counting means which counts a number of overcurrent conditions which take place within said predetermined time period from a starting of operation of said compressor,
   (c) logic means which issues a stopping signal to terminate said operation of said compressor when said number of overcurrent conditions exceeds a predetermined number, and
   (d) pause timer means which counts a pause time necessary for stabilizing a refrigerant circuit before re-starting of said compressor, said pause time being initiated at said termination of operation of said compressor, and for generating a re-starting signal indicative of an elapse of said pause time; and
   switching control means which operatively controlls said inverter to generate said variable AC current to initiate and terminate operation of said compressor responsive to said stopping signal from said logic means, and said re-starting signal from said pause timer means.

4. A trouble detection apparatus in accordance with claim 3, which further comprises indication means, responsive to said stop signal, indicating trouble.

5. A trouble detection apparatus in accordance with claim 3, wherein said signal processing part is constituted by a micro processor.

6. A trouble detection apparatus in accordance with claim 3, wherein said signal processing part is constituted by discrete circuits.

7. A trouble detection apparatus for an air-conditioner comprising:

a driving circuit for an air conditioner;

an air conditioner compressor;

an inverter which feeds variable frequency AC current to said compressor; and control means to detect an overcurrent condition above a predetermined value of current in said driving circuit, and to disable said driving of an air-conditioner when at least two of said overcurrent conditions are detected within a predetermined time, said control means including:

(a) comparator means which generates overcurrent detection signals by comparing a current value signal, which is given by a current value signal generating means and corresponds to a current value of said inverter with a predetermined reference value;

(b) a signal processing part comprising:

(1) timer means which counts a predetermined time period after start of operation of said compressor, during which time period the operation of said compressor becomes substantially stable and which produces a time-up signal indicative thereof, (2) counting means which counts a number of overcurrent conditions which take place within said predetermined time period from a starting of operation of said compressor, (3) logic means which issues a stopping signal to stop said compressor when said number of overcurrent conditions exceed a predetermined number, (4) pause timer means to count a pause time from a stop of said compressor, said pause time being selected to be a time necessary for stabilizing a refrigerant circuit to re-start said compressor, and to generate a re-starting signal indicative thereof;

(c) switching control means to operatively control said inverter to generate said variable AC current to stop and start said compressor by receiving said stopping signal from said logic means and said re-starting signal from said pause timer means, respectively, and (d) indication means for indicating trouble in response to receiving said stop signal.

8. A method for detecting a trouble in a compressor in an air conditioning system, comprising the steps of:

timing the elapse of a first predetermined time period from the start of compressor operation, said predetermined time period being such that after an elapse thereof, a compressor operation becomes stable;

determining an overcurrent condition occurring in the compressor during such first predetermined time period;

counting such occurrences of overcurrent conditions during the first predetermined time period;

determining if a number of the counted overcurrent conditions is larger than a predetermined threshold; and terminating the operation of the compressor when such threshold is exceeded.

9. A method as in claim 8 further comprising the steps of:

determining an overcurrent in the compressor after said first predetermined time period;

stopping the compressor for a predetermined time interval each time an overcurrent condition is determined after the first predetermined time period; and restarting the compressor after such interval.

* * * * *